(12) United States Patent
Chappell

(10) Patent No.: US 11,541,608 B2
(45) Date of Patent: Jan. 3, 2023

(54) WELDING APPARATUS

(71) Applicant: PINWELD LIMITED, England (GB)

(72) Inventor: Keven Chappell, Calne Wiltshire (GB)

(73) Assignee: PINWELD LIMITED, Bristol (GB)

( * ) Notice: Subject to any disclaimer, the term of this patent is extended or adjusted under 35 U.S.C. 154(b) by 223 days.

(21) Appl. No.: 16/763,529

(22) PCT Filed: Nov. 12, 2018

(86) PCT No.: PCT/GB2018/053264
§ 371 (c)(1),
(2) Date: May 12, 2020

(87) PCT Pub. No.: WO2019/092444
PCT Pub. Date: May 16, 2019

(65) Prior Publication Data
US 2020/0361156 A1    Nov. 19, 2020

(30) Foreign Application Priority Data
Nov. 13, 2017 (GB) ..................... 1718751

(51) Int. Cl.
*B29C 65/06* (2006.01)
*B29C 65/20* (2006.01)
(Continued)

(52) U.S. Cl.
CPC .......... *B29C 65/0681* (2013.01); *B29C 65/20* (2013.01); *B29C 65/72* (2013.01);
(Continued)

(58) Field of Classification Search
CPC ..... B29C 65/0681; B29C 65/20; B29C 65/72; B29C 66/1142; B29C 66/1162;
(Continued)

(56) References Cited

U.S. PATENT DOCUMENTS 5,460,317 A * 10/1995 Thomas ............. B23K 20/1255
228/2.1
2014/0091075 A1    4/2014 Liu

FOREIGN PATENT DOCUMENTS

CN    1593834 A    3/2005
EP    2255918 A1   12/2010
(Continued)

OTHER PUBLICATIONS

International Search Report dated Jan. 30, 2019; International Application No. PCT/GB2018/053264.
(Continued)

*Primary Examiner* — James D Sells
(74) *Attorney, Agent, or Firm* — Dinsmore & Shohl LLP

(57) ABSTRACT

A welding apparatus is suitable for welding polymeric materials, and particularly but not exclusively those that may be thin or brittle. A welding apparatus is provided for welding polymeric materials along a weld zone of the polymeric material. The welding apparatus has a carrier for supplying heat to the weld zone to cause melting of the polymeric material, wherein the heating element is arranged to reciprocate relative to the carrier between a retracted and an extended configuration, such that as the element moves from the retracted to the extended configuration the heating element melts and penetrates the surface of the polymeric material. The carrier also has a trailing contact surface trailing the heating element along the weld zone arranged to constrain molten polymeric material in the weld zone. The heating element is also arranged to reciprocate relative to the trailing contact surface.

15 Claims, 2 Drawing Sheets

(51) Int. Cl.
  *B29C 65/72* (2006.01)
  *B29C 65/00* (2006.01)
  *B29C 73/34* (2006.01)
  B29K 105/00 (2006.01)
  B29L 31/30 (2006.01)

(52) U.S. Cl.
  CPC ...... *B29C 66/1142* (2013.01); *B29C 66/1162* (2013.01); *B29C 66/324* (2013.01); *B29C 66/43421* (2013.01); *B29C 66/71* (2013.01); *B29C 66/73921* (2013.01); *B29C 66/81433* (2013.01); *B29C 66/836* (2013.01); *B29C 66/861* (2013.01); *B29C 73/34* (2013.01); *B29K 2105/0088* (2013.01); *B29L 2031/3044* (2013.01)

(58) Field of Classification Search
  CPC ............ B29C 66/324; B29C 66/43421; B29C 66/71; B29C 66/73921; B29C 66/81433; B29C 66/836; B29C 66/861; B29C 73/34; B29K 2105/0088
  USPC ........................................................ 156/73.5
  See application file for complete search history.

(56) References Cited

FOREIGN PATENT DOCUMENTS

| | | |
|---|---|---|
| JP | S5948117 A | 3/1984 |
| WO | 9310935 A1 | 6/1993 |
| WO | 9638256 A1 | 12/1996 |
| WO | 2009109668 A1 | 9/2009 |
| WO | 2013154136 A1 | 10/2013 |
| WO | 2015086469 A1 | 6/2015 |

OTHER PUBLICATIONS

Wachtler et al: "Friction Stir Welding von faserverstarkten Polymeren = Friction Stir Welding of fibre-reinforced polymers", Thesis; Jan. 1, 2010 (Jan. 1, 2010), pp. 1-184, XP009163024, figures 26,27(a),27(b),29, p. 23, last paragraph—p. 24, paragraph 2, p. 25, paragraph 1-3.

Troughton, Michael: "Friction Stir Welding" In: "Friction Stir Welding", Jan. 2009 (Jan. 1, 2009), William Andrew, US, XP 055544388, ISBN: 978-0-8155-1581-4,pp. 131-134, DOI: 10.1016/B978-0-8155-1581-4.50016-0, figures 14.3,14.4.

Scialpi Agostini et al: "Ruhrreibschweißen van Plastik mit einer vibrierenden VorwartsA—und Ruckwartsbewegung des Werkzeugs In-line Reciprocating Friction Stir Welding of Plastics", Joining Plastics—Fugen Von Kunststoffen, DVS, Deutscher Verband Fur Schweissen Uno Verwandte Verfahren E.V, Dusseldorf, DE, No. 1, May 1, 2007 (May 1, 2007), XP009510573, ISSN: 1864-3450, the whole document, figure 1.

K Panneerselvam et al: "Joining of Plastics by Frictional Vibration", International Symposium of Research Students on Materials Science and Engineering, Jan. 1, 2004 (Jan. 1, 2004), pp. 1-5, XP055544102, the whole document.

Scialpi A et al: "Viblade: friction stir welding for plastics", Welding International, Taylor & Francis, Abingdon, GB, vol. 23, No. 11, Nov. 1, 2009 (Nov. 1, 2009), pp. 846-855, XP001550019, ISSN: 0950-7116, DOI: 10.1080/09507110902843271 the whole document.

* cited by examiner

WELDING APPARATUS

CROSS-REFERENCE TO RELATED APPLICATIONS

This application is the U.S. national stage of PCT/GB2018/053264 filed Nov. 12, 2018, which claims priority of United Kingdom Patent Application 1718751.9 filed Nov. 13, 2017 both of which are hereby incorporated by reference in their entirety.

FIELD OF THE INVENTION

The present invention relates to a welding apparatus that is suitable for welding polymeric materials, and particularly but not exclusively those that may be thin or brittle.

BACKGROUND OF THE INVENTION

A significant problem exists with repair of large polymeric items, such as for example vehicle bumpers or fairing. If a bumper for example becomes damaged a replacement bumper is simply fitted. However, this is both wasteful and expensive. Furthermore, as the complexity of vehicles increases bumpers may include numerous sensors or other componentry such as proximity sensors that need to be transferred over to a new bumper during a repair. The cost however quickly becomes prohibitive and vehicles are often written off as insurance write offs due to the expense of repairing a relatively simple item.

Traditional welding techniques are not suitable for repairing many different polymeric materials. This is particularly relevant where the polymeric material is thin or brittle.

Furthermore, even if a traditional welding technique was deemed desirable, there are a multitude of different polymeric compositions where determining the composition of the material in order to select the appropriate filler is impossible. Thus traditional welding techniques are impractical.

SUMMARY OF THE INVENTION

The present invention addresses the above-mentioned problems.

According to an aspect of the present invention there is a welding apparatus for welding polymeric materials along a weld zone of the polymeric material, the welding apparatus comprising a carrier and a heating element carried by the carrier for supplying heat to the weld zone to cause melting of the polymeric material, wherein the heating element is arranged to reciprocate relative to the carrier between a retracted and an extended configuration, such that as the element moves from the retracted to the extended configuration the heating element melts and penetrates the surface of the polymeric material, the carrier further comprising a trailing contact surface trailing the heating element along the weld zone arranged to constrain molten polymeric material in the weld zone, where the heating element is also arranged to reciprocate relative to the trailing contact surface.

This welding apparatus allows welding of many polymeric materials that may be thin, brittle and previously impossible to weld to a satisfactory standard. This means that components such as car bumpers need not be scrapped but instead can be repaired. A continuous weld along a weld zone can be achieved.

Furthermore, the welding apparatus is not reliant upon the user selecting the correct filler material as no filler is required. This is particularly beneficial when it is necessary to weld a recycled polymeric material which typically comprises a blend of multiple combined materials.

The carrier is moveable along the weld zone, therefore there is relative movement between the carrier and the polymeric material. The carrier preferably moves relative to a stationary polymeric material in operation.

It will be appreciated that the weld zone may include the join between two pieces of polymeric material. Alternatively, the weld zone may comprise a crack in a polymeric material. The welding apparatus is beneficially for welding adjacent polymeric materials provided in a side by side orientation, wherein the weld zone encompasses both a portion of the adjacent side by side polymeric materials. The adjacent materials may be oriented in different planes with respect to each other. Each of the adjacent materials has an abutment edge and the weld zone beneficially encompasses material extending to the respective edges. The welding apparatus according to the claimed invention may be termed a welding apparatus for butt welding.

The welding apparatus may be portable thereby enabling a compact and easy to use apparatus that can be manoeuvred with relative ease to accommodate complex shapes.

The welding apparatus preferably comprises a single heating element.

It will be appreciated that a trailing contact surface may trail directly behind the heating element in the direction of movement, and/or may trail to the side of the heating element in the direction of movement.

Through melting and penetrating the polymeric material, molten polymeric material is transferred in the weld zone to effectively back fill a space made by a previous action of the heating element reciprocating.

The carrier preferably further comprises a leading contact surface leading the heating element along the weld zone. This provides the benefit of providing stability to the carrier when in use such that the join line of the materials to be joined can more easily be followed. The leading contact surface may have a greater coefficient of friction than the trailing contact surface. This ensures good contact between the leading contact surface and the material to be joined.

The carrier may further comprise a heater element for supplying heat through the leading contact surface. This can be utilised to preheat the weld zone to reduce weld time and improve weld quality.

The heater element beneficially reciprocates at an obtuse angle relative to the trailing contact surface. This is beneficial for the functionality of the welding apparatus as the heater element effectively melts and drives the molten weld material rearwardly. This material is constrained by the trailing contact surface and effectively fills the gap left by the action of the heater element during the previous reciprocation. Accordingly, polymeric material is transferred from the reciprocating heater element rearwardly along the weld zone to fill the weld zone and homogenise the polymeric material on either side of the fault or join.

The obtuse angle is beneficially between 100 degrees and 135 degrees, and even more beneficially between 110 degrees and 120 degrees.

The welding apparatus preferably comprises an actuator operable to cause multiple reciprocations of the heating element in response to a single input. The actuator is preferably a user input, such as a trigger. Thus, upon application of a user input, either multiple reciprocations are output upon a single actuation and release, or preferably multiple reciprocations are output upon a continued and single operation of the user input. This may be achieved for example through maintaining a trigger in a depressed configuration and thereby causing repeated reciprocations of the heating element and therefore as there is relative movement between the weld piece and the carrier a weld along the weld zone may be produced.

The welding apparatus may further comprise a temperature control system for controlling the heat output by the heating element. The temperature control system is preferably configured to cause the heating element to be heated when the heating element is both in the retracted and extended configuration. The temperature control system is preferably configured to monitor the heat output from the heating element and adjust an input to the heating element dependent upon the measured heat output. Accordingly, adjustment to the heat output of the heating element can be adjusted actively ensuring consistency of weld quality. Adjustment may be made for example by changing an input in the form of an electrical parameter through a heating filament provided in the heating element.

The welding apparatus may comprise a user operable input for selecting the heat supplied by the heating element. The temperature control system may be configured to maintain the heat output to the user selected heat output, thereby again ensuring that a consistent heat output is achieved along the entire weld zone, thereby ensuring consistency of weld quality. The welding apparatus may comprise a data storage device for storing temperature data for corresponding polymeric materials. A user may thus input the polymer details of the material to be welded and the appropriate temperature supplied.

The heating element is preferably arranged to project from the carrier in the extended configuration by a projection distance, and the welding apparatus may be configured to enable adjustment of projection distance. Accordingly depth control of the heating element is enabled which is beneficial to control and adjust the projection distance dependent on the thickness of the material to be welded. It is beneficial that for welding thicker materials the projection distance is increased. The projection distance may be actively controlled during use.

The heating element beneficially extends to a head, wherein the head has a circular, semi-circular, diamond or square profile. In the event of utilising a semi-circular head profile, the straight edge be the trailing edge of the head in the direction of movement along the weld zone.

The carrier may comprise a foot having the trailing contact surface and a housing for housing the heating element, and wherein the position of the housing relative to the foot is adjustable between a plurality of operative positions. This has advantages in that by changing the position of the housing relative to the foot, the angle of the heating element relative to the foot can also be changed. This is beneficial for use with different polymeric materials to be welded and/or different thicknesses of polymeric material to be welded. A means to secure the housing relative to the foot in the plurality of operative positions is preferably provided, meaning that the relative angle between the housing and therefore the heating element can be changed and fixed for use at the desired angle.

The carrier may comprise a handle arrangement for grasping by a user. The welding apparatus may therefore be drawn along the weld zone in a weld direction.

A rotationally mounted element such as one or more wheels may be provided for enabling rotational movement of the carrier along the weld zone. The weld apparatus can therefore be pushed or pulled with ease along the weld zone in a controlled manner, either by a user or alternatively by machinery.

The carrier preferably comprises a housing for housing the heating element, and wherein a separation gap is preferably provided between the housing and the heating element. The separation gap is preferably an air gap. The separation gap is provided to reduce heat transfer from the heating element to the housing, where the housing may be grasped by an operator.

Also according to the present invention there is a method of welding a polymeric material comprising moving a carrier relative to a polymeric material along a weld zone of the polymeric material, wherein the carrier carries a heating element for supplying heat to the weld zone to cause melting of the polymeric material, reciprocating the heating element relative to the carrier between a retracted and an extended configuration such that as the element moves from the retracted to the extended configuration the heating element melts and penetrates the surface of the polymeric material, and constraining molten polymeric material trailing the heating element along the weld zone.

It will be appreciated that the carrier moves along the weld zone. Preferably, the carrier physically moves while the polymeric material remains stationary.

The method preferably operates in the sequence of:
extending the heating element to the extended configuration where the heating element melts and penetrates the surface of the polymeric material;
retracting the heating element to the retracted configuration;
causing relative movement of the polymeric material and the carrier along the weld zone;
and subsequently repeating the sequence along the weld zone.

The method preferably comprises providing adjacent polymeric materials in a side by side orientation, where the weld zone encompasses a portion of both the adjacent side by side polymeric materials.

The method preferably controls movement of the heating element such that the heating element moves at a slower speed or pauses movement at or near the extended configuration. Preferably movement of the heating element is paused at the extended configuration to cause increased heat transfer to the weld zone.

The welding apparatus according to the present invention may be utilised to weld numerous polymeric materials to include a non-exhaustive list of polypropylene, polyethylene, ABS and polycarbonate, PVC and polyamide. Further blends of these materials may also be welded. This avoids the complex requirement of matching filler material with the respective material to be welded which is particularly difficult with blended materials. Welding of polypropylene and blended polypropylene has significant benefits as is widely used in vehicles in, for example, bumpers and brackets for mounting light fixtures which are complex and expensive parts.

BRIEF DESCRIPTION OF THE DRAWINGS

Aspects of the present invention will now be described by way of example only with reference to the accompanying drawings where:

Figure 1a also shows a portion of the welding apparatus according to an illustrative embodiment without polymeric material to be welded.

DETAILED DESCRIPTION OF THE INVENTION

Figure 1:
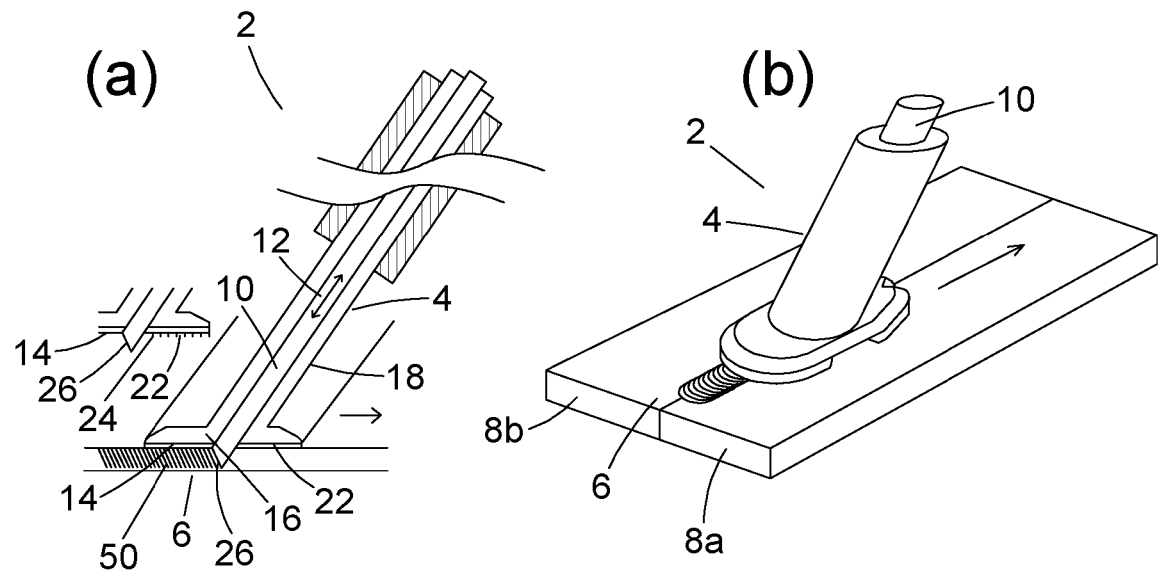
FIGS. 1a and 1b are schematic cross sectional and perspective representations of an illustrative embodiment of the present invention.

Referring to FIG. 1 there is a welding apparatus 2 for welding polymeric materials comprising a carrier 4 moveable along a weld zone 6 of the polymeric material 8a,b to be joined or repaired. A heating element 10 is carried by the carrier 4 for supplying heat to the weld zone 6 to cause melting of the polymeric material. Arrow 12 indicates a direction of reciprocation of the heating element 10 and in Figure 1a is shown in an extended configuration. The carrier further comprises a trailing contact surface 14 trailing the heating element 10 along the weld zone arranged to constrain molten polymeric material in the weld zone. The trailing contact surface 14 is carried by a foot 16 and in the exemplary embodiment the foot 16 protrudes from a housing 18 for housing the heating element 10.

It will be appreciated that the heating element may be heated by a variety of means such as a resistance heating element provided embedded in the heating element 10. It will be appreciated that the heating element 10 reciprocates relative to the trailing contact surface 14 and thus the foot 16.

The trailing contact surface 14, which may be provided by a foot 16 or a part of a housing of the carrier, may comprise heating or cooling systems to augment the finish of the weld. Also provided may be a roller or blade which can be cushioned, where the roller or blade are provided to modify the appearance of the weld. For example, the roller or blade may smooth the weld thus reducing the subsequent processing required. Alternatively or in addition, one or more sensors may be provided to relay thermal data to a control system for actively causing modification of operating parameters such as heating element temperature or depth of penetration of the heating element. In addition, equipment to determine weld quality may be provided, such as time of flight measuring equipment for detecting flaws or voids in the weld.

The carrier further comprises a leading contact surface 22 arranged to lead the heating element 10 along the weld zone 6. This leading contact surface 22 forms a portion of the foot 16 and may protrude forwardly from the housing 18. The leading contact surface 22 has a surface formation for gripping onto the material to be welded through the provision of a roughened surface. The roughened surface may comprise multiple projections 24 for engaging with the material of the weld zone 6. A heater element (not shown) may be provided for supplying heat through the leading contact surface 22. This acts to preheat the weld zone prior to the action of the heating element 10 to reduce the time required for reciprocations of the heating element 10 and improve weld quality. The temperature of the leading contact surface can be controlled independently to that of the heating element 10.

The heating element 10 is shown as reciprocating at an obtuse angle relative to the trailing contact surface 14. This means that as the polymeric material in the weld zone 6 is heated and penetrated, the heating element 10 drives the molten material rearwardly and backfills the weld zone. The obtuse angle is between 100 degrees and 135 degrees, and even more preferably between 110 degrees and 120 degrees. The exact obtuse angle may be modified by modification of the angle of the drive surface provided by the head 26 as described below. Thus, the obtuse angle of the heating element by be effectively reduced through the provision of the drive surface being shaped to open the drive surface relative to the weld zone through chamfering of the drive surface of the head.

The heating element extends to a head 26, wherein the head 26 comprises a drive surface indicated at reference numeral 26 that preferably both heats and drives the molten material in the weld zone rearwardly in the direction of relative movement of the carrier and weld zone. The head and thus the drive surface can take various forms such as a circular, semi-circular, diamond or square profile as examples only, which each provide slightly different weld profiles.

The heating element is arranged to project from the carrier in the extended configuration by a projection distance, and the welding apparatus is configured to enable adjustment of projection distance. This can be achieved by a variety of simple means not present in the Figures by repositioning of the heating element relative to the housing 18 to control projection from the housing 18 in operation. This enables different thickness materials to be appropriately welded.

Figure 2:
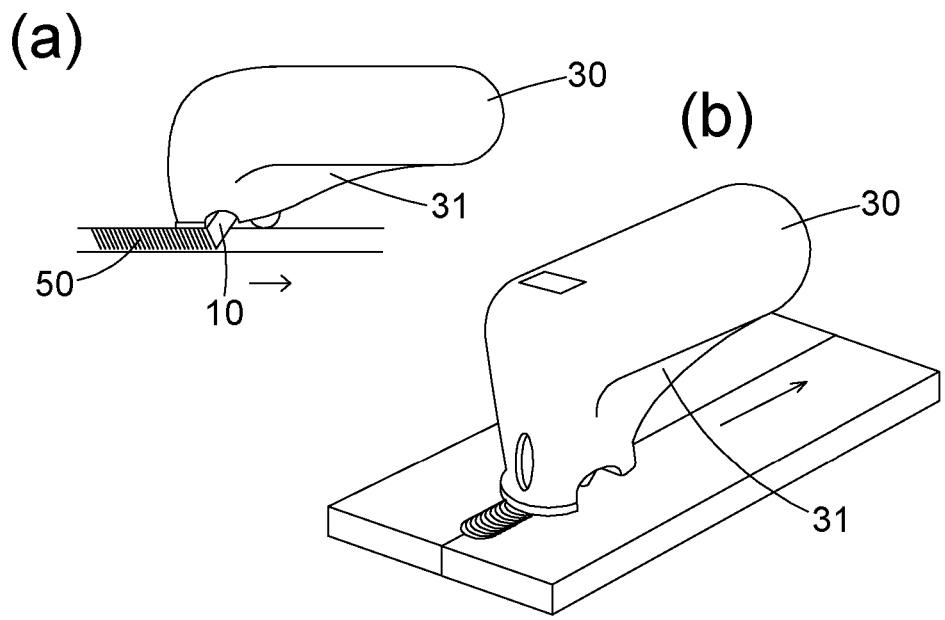
FIGS. 2a and 2b are schematic cross sectional and perspective representations of an illustrative embodiment of the present invention.

Referring now to FIGS. 2a and b a welding apparatus according to an illustrative embodiment is presented and the welding apparatus is shaped to be handheld. A housing 30 is provided arranged to sit into an operator's hand. An actuator 31 is operable to cause reciprocation of the heating element in response to an input. Multiple reciprocations are preferably caused through continued depression of the actuator 31, which may be in the form of a trigger.

Figure 3:
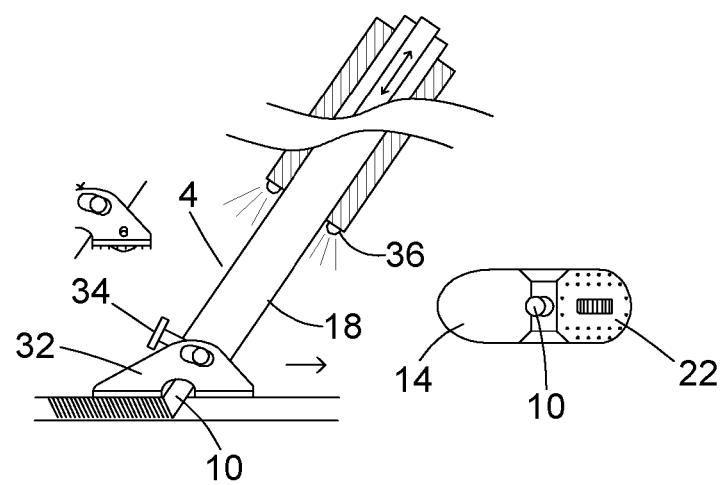
FIG. 3 is a further schematic representation of a cross sectional side view and underside view of an illustrative embodiment of the present invention.

Referring now to FIG. 3, the carrier 4 comprises a foot 32 having the trailing contact surface and in this embodiment the leading contact surface 22, where the position of the housing 18 relative to the foot is adjustable between a plurality of operative positions through the provision of a means to secure the housing relative to the foot in the plurality of operative positions. Such a mechanism enables tilting of the housing 18 and thus heating element 10 relative to the foot 32 and allows fixing in position through securing element 34. Also in the embodiment of FIG. 3 are lights 36 to aid operation.

Figure 4:
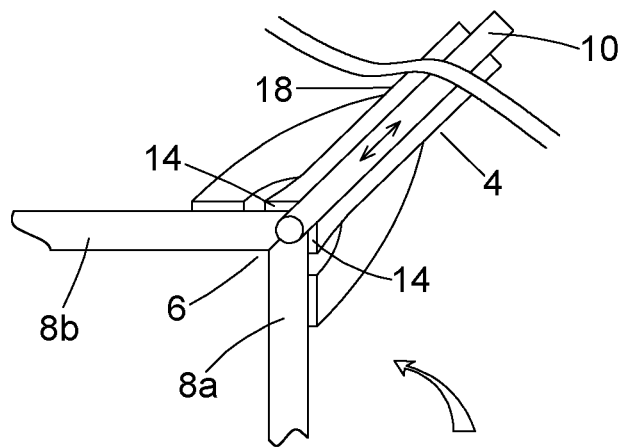
FIG. 4 is a cross sectional side view of an illustrative embodiment of the present invention.

Referring to the embodiment of FIG. 4, the trailing contact surface is adjacent either side of the heating element 10, and additional stabilising portions 38 are provided are stabilising the welding apparatus either side of the weld zone 6. Such an embodiment is beneficial for welding two sections of material 8a,b that are not co-planar.

It will be appreciated that any of the embodiments presented may further comprise a rotationally mounted element for enabling rotation movement of the carrier along the weld zone such as one or more wheels. This aids in drawing of the welding apparatus along the weld zone.

In a simplified welding apparatus 2 the temperature of the heating element 10 may be set to a single predetermined temperature, or alternatively the temperature may be selected by the operator based on their experience in judging the thickness of the material to be welded and the material to be welded. Alternatively, the welding apparatus may include a data storage device and processor, wherein stored are appropriate temperature settings for different materials to be welded. The operator may select the appropriate weld material and the heating element 10 be heated to the required temperature. In addition, material thickness may be input allowing this to be taken into consideration for the determination of the heating element temperature.

In another embodiment, selection of the heating element temperature may be automated. In such an embodiment a first sensor may be provided to determine ambient temperature. The temperature of the heating element can then take this reading into account so for higher ambient temperatures the temperature of the heating element may be reduced accordingly. Alternatively or in addition, the welding apparatus may comprise a sensor, or second sensor, adjacent the trailing contact surface. This second sensor may take a reading representative of temperature and compare against the temperature set for the heating element 10 and this information be used to control the temperature of the heating element 10 and/or if applicable the speed of movement of wheels across the weld zone 6.

It will be appreciated that in any of the embodiments presented the welding apparatus may be incorporated into an automated machine, however it is beneficial that the welding apparatus is handheld and can follow the contours of the weld zone appropriately.

In operation the carrier is drawn along a weld zone of the polymeric material either manually or as an automated operation, and wherein the heating element supplies heat to the weld zone to cause melting of the polymeric material through repeated reciprocation between a retracted and an extended configuration. As the heating element moves from the retracted to the extended configuration the heating element melts and penetrates the surface of the weld zone of the polymeric material to be repaired. At the same time flow of the molten polymeric material is constrained by the trailing contact surface trailing the heating element along the weld zone. This can be seen in the Figures, for example by the columns of weld material 50 in FIG. 1a.

In operation the present invention provides numerous advantageous features. An important feature is the provision of the trailing contact surface, which may be carried by a trailing foot. By utilising a heater element in isolation there is expansion of the molten polymer which then spreads out of the intended weld zone due to the effect of heat and the pushing force of the heater element. However the trailing contact surface prevents this and ensures that the area left by the previous action of the reciprocating heater element is filled with the molten polymeric material. This means that the heater element and trailing contact surface are acting together to fill the volume left by the previous operation. Using this technique ensures excellent weld quality and homogeneity of the weld. After welding has been completed the weld only requires light finishing by grinding to provide a smooth finish.

Aspects of the present invention have been described by way of example only and it will be appreciated to the skilled addressee that modifications and variations may be made without departing from the scope of protection afforded by the appended claims.

The invention claimed is:

1. A welding apparatus for welding polymeric materials along a weld zone of the polymeric materials, the welding apparatus comprising:
    a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material; and
    the carrier further comprising a trailing contact surface trailing the heating element along the weld zone arranged to constrain molten polymeric materials in the weld zone, where the heating element is also arranged to reciprocate relative to the trailing contact surface, wherein
    the carrier further comprises a leading contact surface leading the heating element along the weld zone.

2. The welding apparatus according to claim 1 for welding adjacent polymeric materials provided in a side by side orientation, wherein the weld zone encompasses both a portion of the adjacent side by side polymeric materials.

3. The welding apparatus according to claim 1 wherein the leading contact surface has a greater coefficient of friction than the trailing contact surface.

4. The welding apparatus according to claim 1 wherein the carrier further comprises a heater element for supplying heat through the leading contact surface.

5. The welding apparatus according to claim 1, wherein the heater element reciprocates at an obtuse angle relative to the trailing contact surface.

6. The welding apparatus according to claim 5 wherein the obtuse angle is between 100 degrees and 135 degrees.

7. A welding apparatus for welding polymeric materials along a weld zone of the polymeric materials, the welding apparatus comprising:
    a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material;
    the carrier further comprising a trailing contact surface trailing the heating element along the weld zone arranged to constrain molten polymeric materials in the weld zone, where the heating element is also arranged to reciprocate relative to the trailing contact surface; and
    a temperature control system for controlling a heat output from the heating element.

8. The welding apparatus according to claim 7, wherein the temperature control system is configured to cause the heating element to be heated when the heating element is both in a retracted and an extended configuration, and/or where the temperature control system is configured to monitor the heat output from the heating element and adjust an input to the heating element dependent upon a measured heat output.

9. A welding apparatus for welding polymeric materials along a weld zone of the polymeric materials, the welding apparatus comprising:
    a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material; and
    the carrier further comprising a trailing contact surface trailing the heating element along the weld zone arranged to constrain molten polymeric materials in the weld zone, where the heating element is also arranged to reciprocate relative to the trailing contact surface, wherein the heating element is arranged to project from the carrier in the extended configuration by a projection distance, and the welding apparatus is configured to enable adjustment of the projection distance.

10. A welding apparatus for welding polymeric materials along a weld zone of the polymeric materials, the welding apparatus comprising:
   a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material; and
   the carrier further comprising a trailing contact surface trailing the heating element along the weld zone arranged to constrain molten polymeric materials in the weld zone, where the heating element is also arranged to reciprocate relative to the trailing contact surface, wherein
   the heating element extends to a head, wherein the head has a circular, semi-circular, diamond or square profile.

11. A welding apparatus for welding polymeric materials along a weld zone of the polymeric materials, the welding apparatus comprising:
   a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material; and
   the carrier further comprising a trailing contact surface trailing the heating element along the weld zone arranged to constrain molten polymeric materials in the weld zone, where the heating element is also arranged to reciprocate relative to the trailing contact surface, wherein
   the carrier comprises a foot having the trailing contact surface and a housing for housing the heating element, and wherein a position of the housing relative to the foot is adjustable between a plurality of operative positions.

12. The welding apparatus according to claim 11, wherein the welding apparatus is configured such that the housing may be fixed in position relative to the foot.

13. A welding apparatus for welding polymeric materials along a weld zone of the polymeric materials, the welding apparatus comprising:
   a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material; and
   the carrier further comprising a trailing contact surface trailing the heating element along the weld zone arranged to constrain molten polymeric materials in the weld zone, where the heating element is also arranged to reciprocate relative to the trailing contact surface, wherein
   the carrier comprises a handle arrangement for grasping by a user.

14. A welding apparatus for welding polymeric materials along a weld zone of the polymeric materials, the welding apparatus comprising:
   a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material;
   the carrier further comprising a trailing contact surface trailing the heating element along the weld zone arranged to constrain molten polymeric materials in the weld zone, where the heating element is also arranged to reciprocate relative to the trailing contact surface; and
   a rotationally mounted element for enabling rotation movement of the carrier along the weld zone.

15. A welding apparatus for welding polymeric materials along a weld zone of the polymeric materials, the welding apparatus comprising:
   a carrier for supplying heat to the weld zone to cause melting of the polymeric materials, wherein a heating element is arranged to reciprocate relative to the carrier between a retracted and an extended configuration, such that as the element moves from the retracted to the extended configuration the heating element melts and penetrates a surface of the polymeric material; and
   the carrier further comprising a trailing contact surface trailing the heating element along the weld zone arranged to constrain molten polymeric materials in the weld zone, where the heating element is also arranged to reciprocate relative to the trailing contact surface, wherein
   the carrier comprises a housing for housing the heating element, and wherein a separation gap is provided between the housing and the heating element.

* * * * *